United States Patent
Ewert

(10) Patent No.: US 11,585,945 B2
(45) Date of Patent: Feb. 21, 2023

(54) METHOD FOR THE SATELLITE-SUPPORTED DETERMINATION OF A POSITION OF A VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 16/772,479

(22) PCT Filed: Dec. 12, 2018

(86) PCT No.: PCT/EP2018/084496
§ 371 (c)(1),
(2) Date: Jun. 12, 2020

(87) PCT Pub. No.: WO2019/121211
PCT Pub. Date: Jun. 27, 2019

(65) Prior Publication Data
US 2020/0386897 A1    Dec. 10, 2020

(30) Foreign Application Priority Data
Dec. 19, 2017 (DE) ..................... 10 2017 223 200.5

(51) Int. Cl.
*G01S 19/28* (2010.01)
*G01S 19/42* (2010.01)

(52) U.S. Cl.
CPC ............. *G01S 19/28* (2013.01); *G01S 19/42* (2013.01)

(58) Field of Classification Search
CPC ........... G01S 19/22; G01S 19/28; G01S 19/42
See application file for complete search history.

(56) References Cited

U.S. PATENT DOCUMENTS

| 2010/0079332 A1 | 4/2010 | Garin |
| 2012/0209519 A1 | 8/2012 | Basnayake |

(Continued)

FOREIGN PATENT DOCUMENTS

| CN | 104656651 A | * | 5/2015 |
| CN | 105807301 A | | 7/2016 |

(Continued)

OTHER PUBLICATIONS

J. Meguro, GPS Accuracy Improvement by Satellite Selection Using Omnidirectional Infrared Camera, 2008 IEEE/RSJ International Conference on Intelligent Robots and Systems, p. 1804-1810, Sep. 2008 (Year: 2008).*

(Continued)

*Primary Examiner* — Bernarr E Gregory
*Assistant Examiner* — Fred H Mull
(74) *Attorney, Agent, or Firm* — Maginot, Moore & Beck LLP

(57) ABSTRACT

A method for the satellite-supported determination of a position of a vehicle includes identifying a plurality of satellites which may be usable for determining a position of a vehicle and receiving data which characterize movable reception obstacles in a vicinity of the vehicle. The method includes determining a reduced selection of satellites from the plurality of satellites, based on the received data, and determining the position of the vehicle using signals which have been transmitted from the reduced selection of satellites.

7 Claims, 1 Drawing Sheet

(56) References Cited

U.S. PATENT DOCUMENTS

| | | |
|---|---|---|
| 2013/0050018 A1 | 2/2013 | Jeong et al. |
| 2017/0003395 A1* | 1/2017 | Sasaki ................... G01S 19/28 |
| 2017/0200061 A1 | 7/2017 | Julian et al. |
| 2020/0045568 A1* | 2/2020 | Kwon ................... H04W 24/08 |

FOREIGN PATENT DOCUMENTS

| | | |
|---|---|---|
| JP | H10-111137 A | 4/1998 |
| JP | H10-185600 A | 7/1998 |
| JP | 2007-315766 A | 12/2007 |
| JP | 2017-215285 A | 12/2017 |
| KR | 20180110832 A * | 10/2018 |

OTHER PUBLICATIONS

International Search Report corresponding to PCT Application No. PCT/EP2018/084496, dated Mar. 28, 2019 German and English language document) (7 pages).

* cited by examiner

METHOD FOR THE SATELLITE-SUPPORTED DETERMINATION OF A POSITION OF A VEHICLE This application is a 35 U.S.C. § 371 National Stage Application of PCT/EP2018/084496, filed on Dec. 12, 2018, which claims the benefit of priority to Serial No. DE 10 2017 223 200.5, filed on Dec. 19, 2017 in Germany, the disclosures of which are incorporated herein by reference in their entirety.

The present disclosure relates to a method for the satellite-supported determination of a position of a vehicle. The present disclosure is particularly suitable for application in autonomous driving.

BACKGROUND

The position determination of motor vehicles with the aid of satellites in so-called GNSS systems is a widespread technology which is already used today in navigation systems for motor vehicles. In the future, this technology will also be increasingly relevant in particular to the newly emerging technology sector of autonomous driving.

Position determination via satellite-supported navigation systems is generally based on the principle of the propagation time measurement of signals which are transmitted by the satellites of the navigation system.

An important aspect of position determination is the accuracy, which is essentially a function of the accuracy of the underlying propagation time measurement.

By means of the method described here, the accuracy of the position determination can be increased.

SUMMARY

A method will be proposed here for the satellite-supported determination of an (ego) position of a vehicle. The method has at least the following steps:
a) identifying a plurality of satellites which could be usable for position determination,
b) receiving data which characterize movable reception obstacles in the vicinity of the vehicle,
c) determining a reduced selection of satellites from the plurality of satellites, based on the data received in step b),
d) determining a position of the vehicle using signals which have been transmitted by the reduced selection of satellites.

The method is suitable in particular for position determination in autonomous vehicles. However, the method can also be used in any other application in a vehicle (for example, for a navigation system) or for any other driver assistance system.

An autonomous vehicle is a vehicle which functions without a driver. The vehicle travels autonomously by independently detecting, for example, the course of the road, other road users, or obstacles, and calculating the corresponding control commands in the vehicle, and routing them to the actuators in the vehicle, whereby the trajectory of the vehicle is correctly influenced. In the case of a fully autonomous vehicle, the driver is not involved in the driving process. Currently available vehicles are not yet capable of acting autonomously. On the one hand, this is because the corresponding technology is not yet fully mature. On the other hand, this is because it is currently still prescribed by law that the vehicle driver must be able to maintain control of the driving process at all times. This impedes the implementation of autonomous vehicles. However, there are already various systems which feature autonomous or semi-autonomous driving. These systems are in the intensive test phase. It is currently conceivable that in a few years, fully autonomous vehicle systems will come onto the market once the aforementioned barriers have been removed.

Driver assistance systems are electronic auxiliary devices in motor vehicles for assisting the driver in certain driving situations. Here, the emphasis is often on safety aspects, as well as increasing driving comfort. A further aspect is improving economy. Driver assistance systems intervene semi-autonomously or autonomously into operational, control (for example, fuel, brakes), or signaling devices of the vehicle, or warn the driver briefly before or during critical situations via suitable human-machine interfaces. Currently, most driver assistance systems are designed in such a way that the responsibility remains with the driver, who thus retains control. For driver assistance systems, various types of environmental sensors are used, including ultrasound (parking assistance), radar (lane-change assist, automatic proximity warning system), lidar (blind spot monitoring, automatic proximity warning system, distance control, pre-crash and pre-brake), camera (lane departure warning system, traffic sign recognition, lane-change assist, blind spot monitoring, emergency braking system for pedestrian protection), GNSS sensors (for positioning the vehicle).

As will be described below in greater detail, the method may in particular be used in conjunction with so-called car-to-car communication.

Car-to-car (Car2Car or C2C) communication is to be understood to mean the exchange of information and data between (motor) vehicles. The object of this data exchange is to inform the driver of critical and hazardous situations at an early stage. The relevant vehicles collect data such as ABS interventions, steering angle, position, direction, and speed, and transmit these data via radio (WLAN, UMTS, etc.) to the other road users. Thus, the "visual range" of the driver is to be increased via electronic means. Car-to-infrastructure (C2I) communication is to be understood to mean the exchange of data between a vehicle and the surrounding infrastructure (for example, traffic light systems). The aforementioned technologies are based on the interactions of sensors of the various road users, and use the latest methods of communication technology for exchanging this information.

The method may furthermore be used in a position sensor or in an electronic circuit of a position sensor. The position sensor may also be a motion sensor via which changes in position are detected.

Position sensors may also be provided as combined motion and position sensors. Corresponding position sensors are needed for automated driving, and calculate a highly accurate vehicle position with the aid of navigation satellite data (GPS, GLONASS, Beidou, Galileo), which are also referred to as GNSS (Global Navigation Satellite System) data. In addition, correction data from so-called correction services may also be used in the sensor in order to calculate the position of the vehicle more accurately. Along with the received GNSS data, a highly accurate time (such as Universal Time) is also regularly read into the position sensor and is used for determining the exact position. Additional input data into the position sensor may include wheel speeds, steering angles, and acceleration and rotational rate data.

In a standard setting, a corresponding position sensor evaluates all visible satellites in the sky for the internal position determination, based on the almanac. In certain scenarios, for example, in city traffic, this may result in erroneous position determinations, since satellite data are also taken into consideration from satellites which are not visible due to building occlusion. So-called multipath reflections of the occluded satellites off the surrounding buildings are also received and evaluated in the position sensor. As a result, the position determination in the position sensor is negatively affected. This aspect can be counteracted via the method described here.

The vehicle for which the method described here is used may be an automobile. Preferably, the vehicle is an autonomous vehicle. However, the method may also be carried out in and via any other vehicle. The method may in particular contribute to or may be used for a dynamic selection of GNSS data in a position sensor of a vehicle. In other words, the method may be described in particular by saying that those satellites which are not visible for a certain period due to movable reception obstacles, in particular other road users in the road traffic, are temporarily excluded from the calculations of the vehicle position.

In step a), a plurality of satellites is first identified which can be used for position determination, i.e., for determining the vehicle (ego) position. Satellites may also be detected therefrom which are temporarily shadowed or which are not available for direct signal reception.

In step b), reception takes place of data which characterize movable reception obstacles in the vicinity of the vehicle. "Movable" reception obstacles are to be understood to be reception obstacles which are able to change their (geodesic) position relative to a fixed point on the surface of the earth. Movable reception obstacles may in particular be other road users, preferably other motor vehicles such as automobiles and/or trucks. Data characterizing movable reception obstacles may, for example, comprise the type of obstacle, its location, position, spatial extent, spatial orientation, speed, and/or acceleration. These data may be provided by the movable reception obstacle itself. Alternatively or cumulatively, the ego vehicle may be equipped with sensors, for example, environmental sensors, for gathering at least some of these data. The data thus gathered may be conveyed to a position sensor receiving said data (inside the ego vehicle). Furthermore, at least some of the data may also be provided (indirectly) by a central management device.

For the accuracy of the position determination, it is of particular significance in particular also to identify and to take into consideration movable reception obstacles as reception obstacles. Movable reception obstacles differ from immovable reception obstacles with respect to their effects on the exact position determination, in particular in that they occur more unexpectedly, and their effects on the position determination are therefore more difficult to predict and estimate.

For example, the determination of the location of other road users relative to the ego vehicle may take place with the aid of environmental sensors or via a position exchange between the vehicles (for example, car-to-X). Subsequently, the determination of the vehicle dimensions may take place via the environmental sensors of the ego vehicle or via a transmission of the vehicle dimensions from the vehicles via a communication interface (for example, car-to-X). For detecting movable reception obstacles, it is possibly also sufficient to use only the environmental sensors of the motor vehicle. In a further step, the location of the vehicle on a map may be determined, and the orientation of the vehicle with respect to the visible satellites may be determined therefrom. In addition to the ego vehicle, the other movable obstacles are also located relative to the ego vehicle on the highly accurate map, and are charted or mapped with respect to the position and orientation relative to the ego vehicle and the satellites in the sky.

In step c), a determination takes place of a reduced selection of satellites from the plurality of satellites, based on the data received in step b). For this purpose, from the data received in step b), for example, a (shortest) distance between the reception obstacle and the ego vehicle and/or a (possible) shadowing (probability) of the satellite signal of a certain satellite by the reception obstacle, may be calculated or forecast. A correspondingly shadowed satellite may then be excluded from the reduced selection, so that only satellites are taken into consideration for position determination in step d) of which the signals can be received directly.

According to an advantageous embodiment, it is proposed that satellites of which the transmitted signals could be or are influenced by movable reception obstacles which are characterized by the data received in step b), are omitted from the plurality of satellites in step c).

If, for example, an automobile passes a truck, the satellites of the almanac behind the truck may be excluded from the position calculations for the duration of the passing maneuver. Multipath reflections of the same satellites off other road users, infrastructure facilities, and/or buildings, for example, on the side of the ego vehicle facing away from the truck, may be ignored in this case. After the passing maneuver, a renewed consideration of the satellites which are now again visible may take place in the position calculations. In this way, the position determination may be particularly advantageously improved, in particular since multipath reflections of non-visible satellites remain disregarded from the outset due to the complete exclusion of these satellites from the calculations.

According to another advantageous embodiment, it is proposed that satellites which are at an angle with respect to the horizon which is smaller than a minimum angle of inclination are (additionally) omitted from the plurality of satellites in step c). The minimum angle of inclination may, for example, be 15° [degrees] or even 30°.

Thus, satellites which are at an angle of inclination which is small or too small with respect to the horizon (for example, <15°), may be generally rejected in the position calculations in certain scenarios. This may take place in particular independently of whether or not these satellites are occluded by a movable reception obstacle or an immovable reception obstacle. This embodiment of the method may be implemented with relatively little effort, since the satellites which are at a low angle of inclination can be extracted from the GNSS almanac. When calculating the GNSS-based position, therefore, only those satellites are used which are at a sufficiently high angle of inclination with respect to the horizon. In addition, it is particularly preferable that the selection of the valid satellites is updated from time to time (for example, at least every five minutes), in order to ensure that satellites which are rising on the horizon and which are at a sufficiently high angle of inclination with respect to the horizon are again taken into consideration, and satellites which in turn are sinking on the horizon are excluded from the calculations as soon as they fall below the minimum angle of inclination with respect to the horizon. However, this embodiment of the method may also be counterproductive in practice. For example, in city traffic, preferably all available satellites should be used to be able to determine the vehicle position in a highly accurate manner. This is, inter alia, necessary due to high buildings, which may occlude certain satellites. In addition, the described method may be extended in that, for position determination, in addition, depending on the position and surroundings of the vehicle, it is decided whether or not criteria for reducing the selection of satellites are used in step c).

According to an advantageous embodiment, it is proposed that in step b), in addition, data are received which characterize immovable reception obstacles, and in step c), the selection of satellites is additionally reduced based on these data. "Immovable" reception obstacles may, for example, be infrastructure facilities such as noise protection walls; buildings, in particular tall buildings; plants, in particular tall trees; or elevated landscape features such as mountains. Data characterizing immovable reception obstacles may, for example, comprise the type of obstacle, its location, position, and/or spatial extent. These data may be provided by the immovable reception obstacle itself (car-to-X communication). Alternatively or cumulatively, the ego vehicle may be equipped with sensors, for example, environmental sensors, for gathering at least some of these data. The data thus gathered may be conveyed to a position sensor receiving said data (inside the ego vehicle). Furthermore, at least some of the data may be provided by a central management facility. This may take place, for example, via a cloud and/or a cloud-based service.

In this case, use may be made of the instantaneous position of the vehicle in the world. In addition, use may be made of highly accurate map data, which are available in any case for automated driving, in order to identify immovable reception obstacles. Such data may also be used in a supporting manner to identify movable reception obstacles, in that, depending on the location and possibly also the time of day, it is identified whether movable objects are to be expected, how many movable reception obstacles are to be expected, and which kinds of movable reception obstacles are to be expected.

The position sensor or a central computer of the vehicle generally already knows the highly accurate position of the vehicle on a highly accurate world map. In addition, (depending on the implementation), an analysis of the satellite almanac in the sky relative to the instantaneous vehicle position and the vehicle orientation on the map may take place by means of the position sensor or the central computer of the vehicle. Subsequently, those satellites which are not visible, for example, due to buildings or structures at the current vehicle position, may be rejected in the position calculations. For this purpose, elevation data of buildings and structures along a road are generally also located on the highly accurate map. If, for example, a tall building is located on the right side of the vehicle, all satellites which are located on the horizon behind the building and which are thus not directly visible by the vehicle antenna at their angle of inclination with respect to the horizon may be excluded from the calculations. As a result, the multipath reflections of these occluded satellites off other surrounding buildings relative to the vehicle may also remain disregarded. If the vehicle then continues to move along the road and the view of the previously occluded satellites is re-established after driving by the aforementioned building, the satellites which are now again visible may be taken into consideration in the calculations. Satellites which are occluded due to structures or buildings at the current new vehicle position may in turn be excluded from the calculations. This embodiment of the method thus allows a dynamic selection of satellites in the calculations, as a function of a world map and the associated structures located around the vehicle. In this way, the position determination may be significantly improved, in particular since calculation inaccuracies due to multipath reflections of non-visible satellites may also be significantly reduced or even avoided by completely excluding these satellites from the calculations from the outset.

According to an advantageous embodiment, it is proposed that the data received in step b), which characterize movable reception obstacles, originate at least partially from communication with other vehicles which form movable reception obstacles in the vicinity of the vehicle. In this case, the communication is advantageously so-called car-to-car communication. Thus, for example, other road users may provide additional data, for example, their type of vehicle, location, position, spatial extent, spatial orientation, speed, and/or acceleration, to the vehicle by means of car-to-car or car-to-X communication. In further embodiment variants, a combination of environmental sensors and car-to-X communication is used to precisely determine the position, type, and extent of movable reception obstacles, and to provide corresponding data for step b).

According to an advantageous embodiment, it is proposed that the data received in step b) which characterize movable reception obstacles have been at least partially determined via environmental sensors of the vehicle. In addition, it may be provided that the additionally received data in step b) which characterize immovable reception obstacles have been at least partially determined via environmental sensors of the vehicle. An environmental sensor may, for example, be an ultrasonic, radar, lidar, or camera sensor which is attached in or to the vehicle.

In addition, a position sensor is to be described here which is configured for carrying out a method described here. Preferably, the position sensor is arranged in or on the vehicle, or is provided and configured for mounting in or such a vehicle. Preferably, the position sensor is a GNSS sensor. The position sensor is furthermore preferably configured for autonomous operation of the vehicle. Furthermore, the position sensor may be a combined motion and position sensor. Such a sensor is particularly advantageous for autonomous vehicles.

A computer program for carrying out a method described here is also to be described here. In other words, this relates in particular to a computer program (product) comprising commands which, when the program is executed by a computer, cause said computer to execute a method described here. The position sensor or a computing unit (processor) of the position sensor accesses, for example, the computer program, to execute the method.

Furthermore, a machine-readable storage medium on which the computer program is stored is also to be described. The machine-readable storage medium is frequently a computer-readable data medium.

The details, features, and advantageous embodiments which have been discussed in conjunction with the method may also correspondingly arise in the case of the position sensor, the computer program, and/or the storage medium which have been proposed here, and vice-versa. In this respect, reference will be made entirely to the local embodiments for characterizing the features in greater detail.

BRIEF DESCRIPTION OF THE DRAWINGS

The approach proposed here and its technical field will be described in greater detail below based on the figures. It should be noted that the present disclosure is not to be limited to the depicted exemplary embodiments. In particular, if it is not explicitly depicted otherwise, it is also possible to extrapolate sub-aspects of the facts described in the figures and to combine them with other components and/or findings from other figures and/or the present description. The following are schematically depicted.

DETAILED DESCRIPTION

Figure 1:
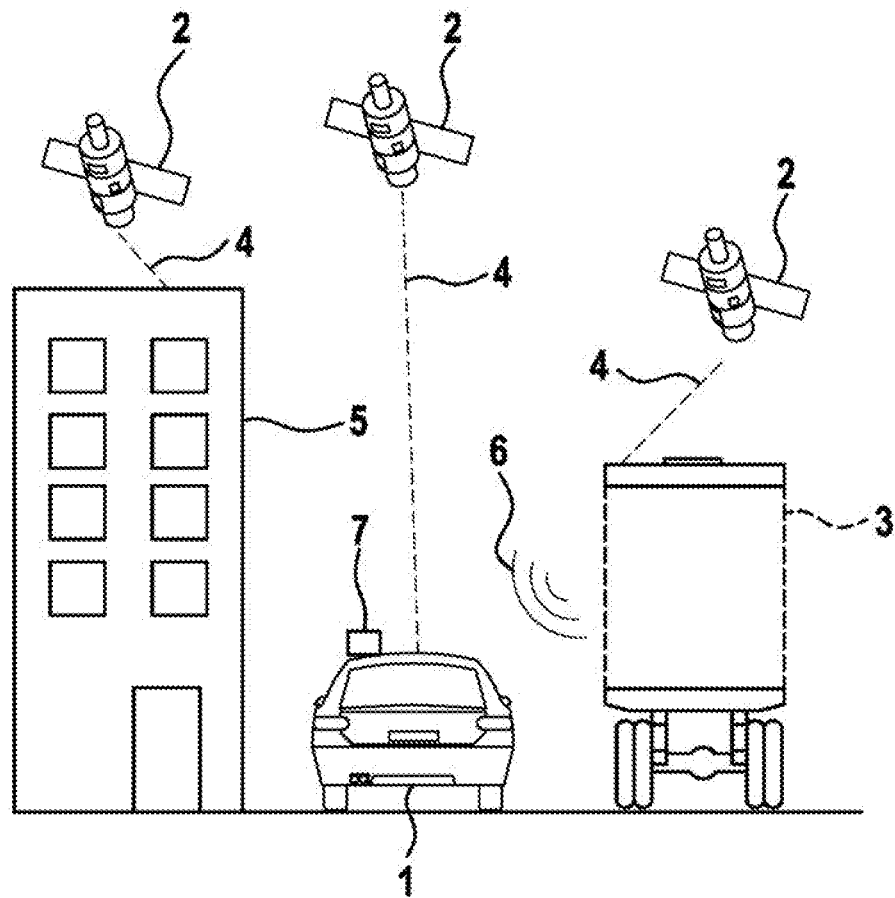
FIG. 1: a vehicle in which a satellite-supported position is determined.

FIG. 1 schematically depicts a vehicle 1, here, an automobile, in which a satellite-supported position is determined. For this purpose, a method described here is used. First, identification takes place of a plurality of satellites 2, here, three satellites 2, which can be usable for position determination. In addition, reception takes place of data which characterize movable reception obstacles 3 in the vicinity of the vehicle 1. Thereafter, a reduced selection of satellites 2 is determined from the plurality of satellites 2, based on the previously received data. In the example depicted here, the satellite 2 depicted on the right side is no longer a component of the reduced selection. Subsequently, a determination takes place of a position of the vehicle 1, using signals 4 which have been transmitted by the reduced selection of satellites 2.

In the example depicted in FIG. 1, the satellite 2 depicted on the right side of FIG. 1, of which the transmitted signals 4 are influenced by the movable reception obstacle 3, is omitted from the plurality of satellites 2. Thus, it is to be gathered from the depiction according to FIG. 1 that the path of the transmitted signals 4 toward the vehicle 1 is blocked by the movable reception obstacle 3. In other words, shadowing occurs due to the movable reception obstacle 3.

Furthermore, in addition, data are received which characterize immovable reception obstacles 5. These data are also used to reduce the selection of satellites 2. Here, the immovable reception obstacle 5 is a building which also results in shadowing. Accordingly, the satellite 2 depicted on the left side of FIG. 1 is removed from the selection of satellites.

In FIG. 1, it is furthermore indicated that the received data which characterize movable reception obstacles 3 may at least partially originate from communication 6 with other vehicles. In this connection, these additional vehicles form movable reception obstacles 3 in the vicinity of the vehicle 1. FIG. 1 depicts such an additional vehicle in the form of a truck which forms the movable reception obstacle 3.

Alternatively or cumulatively, the received data which characterize movable reception obstacles 3 may at least partially be determined via environmental sensors 7 of the vehicle 1. Of course, corresponding environmental sensors 7 may also be used to determine data which characterize immovable reception obstacles 5.

Figure 2:
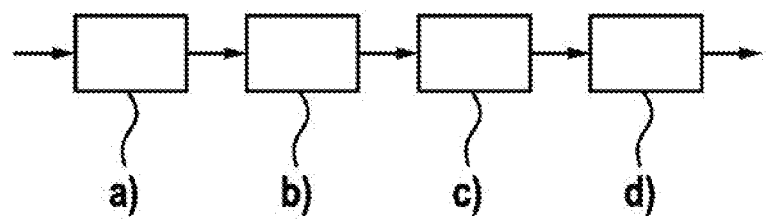
FIG. 2: a flow chart of the described method.

FIG. 2 depicts a flow chart of the described method. Said figure illustrates the method steps a) to d) which are carried out in succession for the position determination.

The method contributes in particular to ensuring a dynamic selection of GNSS data, for example, in a position sensor of a vehicle. Furthermore, the method may contribute to achieving one or several of the following advantages:
multi-path reflections of non-visible satellites may be excluded inside a position sensor,
the position accuracy of the vehicle is increased,
the processing speed in the position sensor is increased, since only visible or relevant satellites from the almanac are included in the calculations.

The invention claimed is:

1. A method for satellite-supported determination of a position of a vehicle, the method comprising:
   identifying a plurality of satellites that are usable for determining a position of a vehicle;
   capturing, using at least one environmental sensor of the vehicle, first data that characterize movable reception obstacles in a vicinity of the vehicle, the movable reception obstacles including another vehicle in the vicinity of the vehicle;
   receiving, from the other vehicle, second data that characterize the other vehicle, the second data including a spatial extent of the other vehicle;
   determining a reduced selection of satellites from the plurality of satellites, based on the captured first data and the spatial extent of the other vehicle from the received second data; and
   determining the position of the vehicle using signals which have been transmitted from the reduced selection of satellites.

2. The method as claimed in claim 1, the determining the reduced selection of satellites further comprising:
   determining a first group of satellites from the plurality of satellites the transmitted signals of which could be influenced by the movable reception obstacles based upon the captured first data and the received second data, the first group of satellites being excluded from the reduced selection of satellites.

3. The method as claimed in claim 1, the determining the reduced selection of satellites further comprising:
   determining a second group of satellites from the plurality of satellites that are at an angle with respect to the horizon which is smaller than a predetermined minimum angle of inclination, the second group of satellites being excluded from the reduced selection of satellites.

4. The method as claimed in claim 1, wherein the first data captured by the at least one environmental sensor of the vehicle also characterize immovable reception obstacles in the vicinity of the vehicle.

5. The method as claimed in claim 4 further comprising:
   receiving, from a respective one of the immovable reception obstacles, third data that characterize the respective one of the immovable reception obstacles, the third data including at least one of (i) a type of obstacle, (ii) a location, (iii) a position, and (iv) a spatial extent of the respective one of the immovable reception obstacles.

6. The method as claimed in claim 1, wherein the at least one environmental sensor of the vehicle includes at least one of (i) an ultrasonic sensor, (ii) a RADAR sensor, (iii) a LIDAR sensor, and (iv) a camera sensor.

7. A position sensor for satellite-supported determination of a position of a vehicle, comprising:
   a machine-readable storage medium including program instructions stored therein; and
   a processor operably connected to the machine-readable storage medium and configured to execute the stored program instructions to:
      identify a plurality of satellites that are usable for determining a position of the vehicle;
      receive, from at least one environmental sensor of the vehicle, first data that characterize movable reception obstacles in a vicinity of the vehicle, the movable reception obstacles including another vehicle in the vicinity of the vehicle;
      receive, from the other vehicle, second data that characterize the other vehicle, the second data including at least one of a speed and acceleration of the other vehicle;

determine a reduced selection of satellites from the plurality of satellites, based on the received first data and the at least one of the speed and the acceleration of the other vehicle from the received second data; and determine the position of the vehicle using signals which have been transmitted from the reduced selection of satellites.

\* \* \* \* \*

UNITED STATES PATENT AND TRADEMARK OFFICE
CERTIFICATE OF CORRECTION

| | |
|---|---|
| PATENT NO. | : 11,585,945 B2 |
| APPLICATION NO. | : 16/772479 |
| DATED | : February 21, 2023 |
| INVENTOR(S) | : Ewert |

It is certified that error appears in the above-identified patent and that said Letters Patent is hereby corrected as shown below:

In the Claims

In Claim 7, at Column 8, Line 66: "a speed and acceleration" should read --a speed and an acceleration--.

Signed and Sealed this
Thirtieth Day of May, 2023

Katherine Kelly Vidal
*Director of the United States Patent and Trademark Office*